United States Patent
Welk et al.

(10) Patent No.: US 12,342,282 B2
(45) Date of Patent: Jun. 24, 2025

(54) RADIO FREQUENCY RECEIVER

(71) Applicants: STMicroelectronics (Alps) SAS, Grenoble (FR); STMicroelectronics (Grenoble 2) SAS, Grenoble (FR)

(72) Inventors: Reiner Welk, Sassenage (FR); Danika Perrin, Jarrie (FR)

(73) Assignees: STMicroelectronics (Alps) SAS, Grenoble (FR); STMicroelectronics (Grenoble 2) SAS, Grenoble (FR)

( * ) Notice: Subject to any disclaimer, the term of this patent is extended or adjusted under 35 U.S.C. 154(b) by 479 days.

(21) Appl. No.: 17/939,173

(22) Filed: Sep. 7, 2022

(65) Prior Publication Data

US 2023/0129973 A1    Apr. 27, 2023

(30) Foreign Application Priority Data

Oct. 1, 2021   (FR) ........................... 2110408

(51) Int. Cl.
*H04W 52/02*   (2009.01)
*H04W 52/52*   (2009.01)

(52) U.S. Cl.
CPC ....... *H04W 52/0229* (2013.01); *H04W 52/52* (2013.01)

(58) Field of Classification Search
CPC ........................... H04W 52/0229; H04W 52/52
See application file for complete search history.

(56) References Cited

U.S. PATENT DOCUMENTS

| | | | |
|---|---|---|---|
| 7,898,326 B2 | 3/2011 | Maynard et al. | |
| 8,605,836 B2 | 12/2013 | Murthy et al. | |
| 8,611,836 B2 | 12/2013 | Ripley et al. | |
| 9,209,892 B2 | 12/2015 | Perre et al. | |
| 2005/0003783 A1* | 1/2005 | Ben-Ayun | H03G 3/3078 455/240.1 |
| 2006/0220742 A1* | 10/2006 | Manku | H04W 52/52 330/279 |
| 2013/0095780 A1* | 4/2013 | Prazan | H04B 1/1615 455/234.1 |

FOREIGN PATENT DOCUMENTS

| | | |
|---|---|---|
| CN | 103181077 A | 6/2013 |
| CN | 107357348 A | 11/2017 |
| FR | 2975245 A1 | 11/2012 |
| WO | 2006099530 A2 | 9/2006 |
| WO | 2007122059 A1 | 11/2007 |
| WO | 2019049576 A1 | 3/2019 |

* cited by examiner

*Primary Examiner* — Janice N Tieu
(74) *Attorney, Agent, or Firm* — Slater Matsil, LLP

(57) ABSTRACT

In an embodiment, a radio frequency (RF) receiver circuit includes a main circuit and a wake-up circuit. The main circuit is configured to process RF signals. The wake-up circuit is configured to detect a reception of the RF signals. The wake-up circuit includes an automatic gain control (AGC) loop, and is configured to have a first operating mode where a set point voltage of the loop has a first substantially constant value, and a second operating mode where the set point voltage of the loop has a second value dependent on a power supply voltage of the wake-up circuit.

21 Claims, 4 Drawing Sheets

RADIO FREQUENCY RECEIVER

CROSS-REFERENCE TO RELATED APPLICATIONS

This application claims the benefit of French Application No. 2110408, filed on Oct. 1, 2021, which application is hereby incorporated herein by reference.

TECHNICAL FIELD

The present disclosure generally concerns electronic devices, and in particular embodiments, to radio frequency wave receivers.

BACKGROUND

Radio frequency signal or wave receiver circuits, or receivers, have as a majority an operation comprising two types of periods, waiting periods, during which no radio frequency signal comprising information is received, and active periods, during which radio frequency signals conveying information are received. Since active periods are not always expected, it is important for the receiver to be ready to receive signals. However, the circuit capable of processing the signals may be energy intensive.

It is thus known to include a wake-up circuit consuming less energy and being capable of waking up the processing circuit when radio frequency waves are received.

SUMMARY

There is a need for a radio frequency receiver wake-up circuit which is less power intensive.

An embodiment overcomes all or part of the disadvantages of known radio frequency receiver wake-up circuits.

One embodiment provides a radio frequency signal receiver circuit comprising a main circuit configured to process the radio frequency signals and a wake-up circuit configured to detect the reception of radio frequency signals, the wake-up circuit comprising an automatic gain control loop, the wake-up circuit being configured to have two operating modes:
  a first operating mode where the set point voltage of the loop has a first substantially constant value, and
  a second operating mode where the set point voltage of the loop has a second value dependent on a power supply voltage of the wake-up circuit.

According to an embodiment, the circuit comprises an antenna delivering a first signal to the wake-up circuit on a first node.

According to an embodiment, the wake-up circuit is configured to deliver on a second node a second signal commanding the waking up of the main circuit.

According to an embodiment, the wake-up circuit comprises a resistor coupled between a third node of application of the power supply voltage of the wake-up circuit and the second node.

According to an embodiment, the loop comprises a variable gain circuit, coupled at its input to the first node and coupled to the second node.

According to an embodiment, the loop comprises a circuit for controlling the gain of the variable gain circuit, the control circuit being coupled, by an input, to the second node, and on another input to the set point voltage.

According to an embodiment, the other input is coupled, by a selection element, to fourth and fifth nodes of application of voltages having respectively the first and second values.

According to an embodiment, the fourth node is coupled to a sixth node of application of a reference voltage by a first voltage source delivering on the fourth node a voltage having the first value.

According to an embodiment, the fifth node is coupled to the third node by a second voltage source, in such a way that the voltage on the fifth node is dependent on the power supply voltage.

According to an embodiment, the power supply voltage is in the range from 0.1V to 5 V.

According to an embodiment, a power supply voltage of the main circuit is substantially equal to the power supply voltage of the wake-up circuit.

According to an embodiment, the circuit is configured to operate in on-off keying or in Manchester type on-off keying.

Another embodiment provides an automatic gain control circuit configured to have two operating modes:
  a first operating mode wherein a set point voltage of the circuit has a first value substantially constant, and
  a second operating mode wherein the set point voltage has a second value depending on the supply voltage of the circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
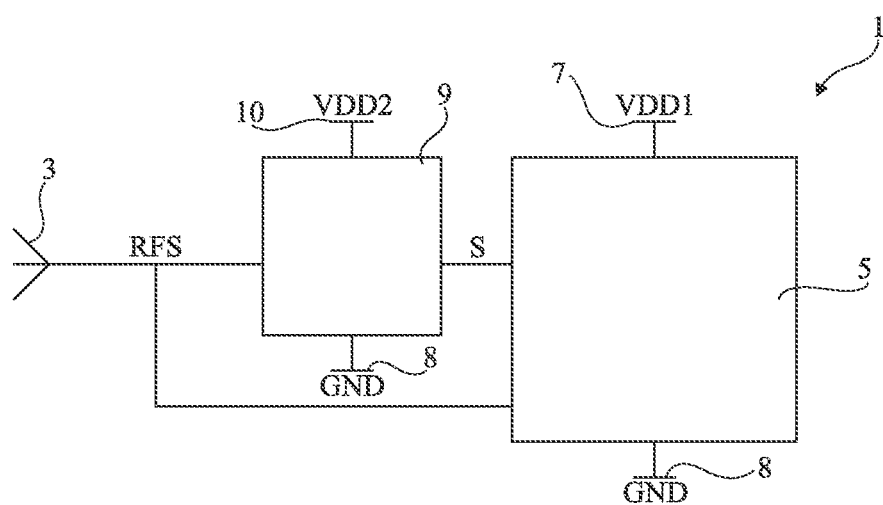
FIG. 1 shows an example of a radio frequency wave receiver circuit to which the embodiments described hereafter apply.

FIG. 1 shows an example of a radio frequency (RF) wave, or signal, receiver circuit 1 to which the embodiments described hereafter can apply. Circuit 1 for example forms part of an electronic device, for example, a cell phone.

Radio frequency waves or signals means waves or signals having an electromagnetic wave frequency in the range from 3 kHz to 300 GHz. Radio frequency waves, or signals, include the frequencies used by different radio communication means, particularly mobile telephony, WiFi or radio broadcasting, as well as signals intended for other uses, such as radars or microwave ovens.

Circuit 1 is a radio frequency wave reception circuit. Circuit 1 comprises an antenna 3. Antenna 3 is configured to receive radio frequency waves.

Circuit 1 comprises a circuit 5, or main circuit, for receiving and processing the waves received via antenna 3. Circuit 5 can further comprise a wave emission circuit. Circuit 5 for example comprises a microprocessor. Circuit 5 is thus coupled, preferably connected, to antenna 3. Circuit 5 is configured to analogically and/or digitally process radio frequency signals RFS received by the antenna.

Circuit 5 is powered with a power supply voltage VDD1. In other words, the circuit receives voltage VDD1, for example, applied between nodes 7 and 8. Circuit 5 is for example coupled, preferably connected, to node 8, having a reference voltage applied thereto, for example, the ground (GND), and is coupled, preferably connected, to node 7, having voltage VDD1 applied thereto. Voltage VDD1 is for example a power supply voltage delivered by the electronic device and for example used in another portion of the device. For example, the power supply voltage is in the range from 0.2 V to 6 V.

Circuit 1 further comprises a radio frequency wave reception circuit 9, or auxiliary circuit. Circuit 9 is a circuit called wake-up radio circuit. Circuit 9 is configured to detect radio frequency signals indicating that signals that can be processed by main circuit 5 are going to be received. The main circuit 5 is then woken up to be ready to process radio frequency signals. Circuit 9 is coupled, preferably connected, to antenna 3 and receives the signal RFS received and transmitted by antenna 3. Circuit 9 is further coupled, preferably connected, to the circuit 5 to which it delivers a signal S, for example, a square signal, enabling to wake up circuit 5.

Circuit 9 is powered with a power supply voltage VDD2. In other words, circuit 9 receives voltage VDD2, for example applied between nodes 8 and 10. Circuit 9 is for example coupled, preferably connected, to node 8, having a reference voltage applied thereto, for example, the ground (GND), and is coupled, preferably connected, to node 10, having voltage VDD2 applied thereto.

During the operation of circuit 1, circuit 1 may receive no radio frequency waves for long periods of time. During these time periods, keeping main circuit 5 in operation results in a high power consumption. It is thus known to use wake-up circuit 9. Thus, when circuit 5 is off, at standby, or in a low-power mode, circuit 9 is kept in operation. Circuit 9 receives and detects the radio frequency signals and determines whether circuit 5 needs being woken up.

In existing wake-up circuits, circuit 9 receives a power supply voltage VDD2 smaller than voltage VDD1, and generated for circuit 9. However, the generation of this voltage for circuit 9 implies the presence of an additional circuit in circuit 1, for example, a linear voltage regulator. Further, due to the low power supply voltage, the linearity of the circuit 9 can be affected.

Figure 2:
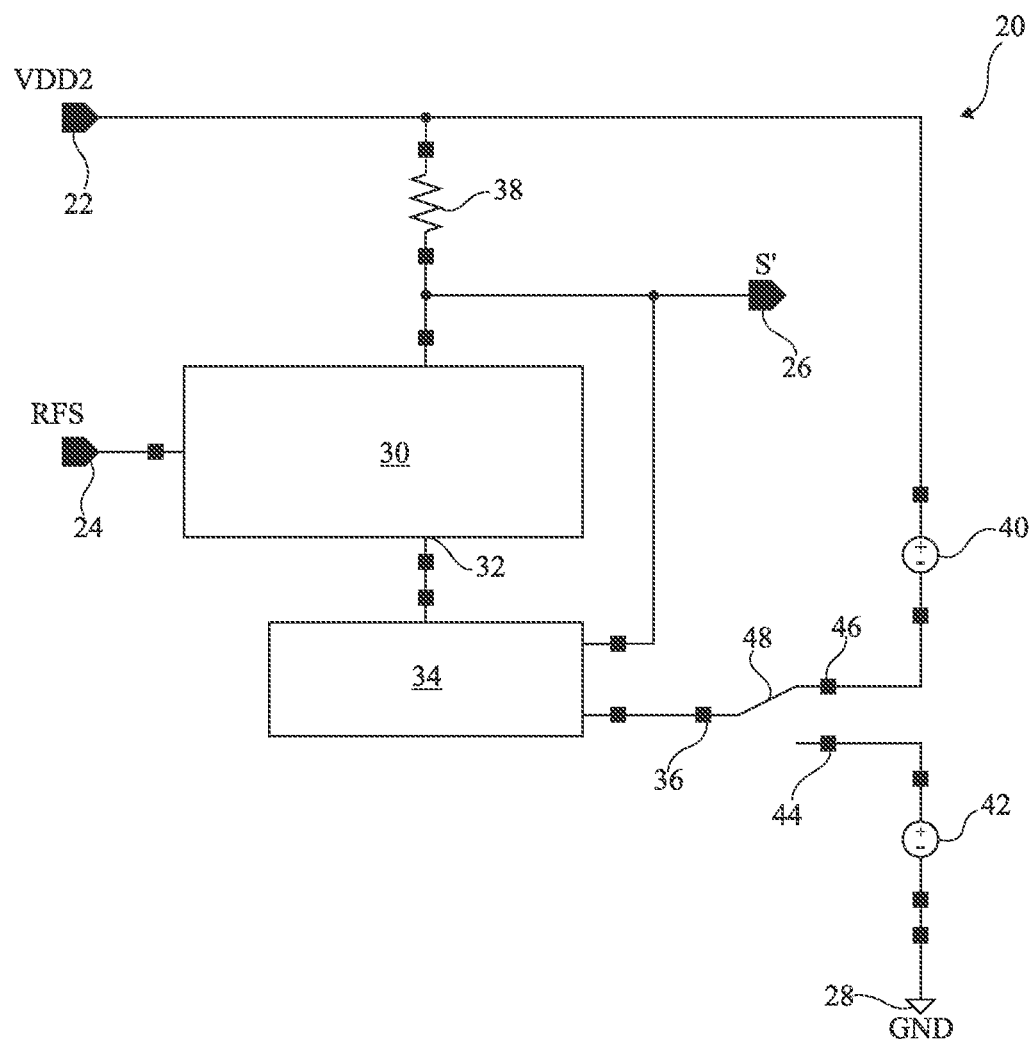
FIG. 2 schematically shows a part of an embodiment of a radio frequency wave receiver circuit.

FIG. 2 schematically shows a part of an embodiment of a circuit 20. Circuit 20 is an automatic gain control circuit. Circuit 20 is for example a radio frequency wave receiver. Circuit 20 is for example a part, for example a first level, of a wake-up circuit, such as the circuit 9 of FIG. 1. In the example described here, circuit 1 in On-Off Keying or OOK. Circuit 1 can also operates in Manchester type On-Off Keying.

Circuit 20 comprises an input node 22, having power supply voltage VDD2 received thereon. In the embodiment of FIG. 2, voltage VDD2 is for example in the range from 0.1V to VDD1, for example in the range from 0.1V to 5 V, for example from 1.7 V to 3.7 V. Power supply voltage VDD2 is for example a power supply voltage used in another circuit of the device. Voltage VDD2 is for example substantially equal to voltage VDD1. Circuit 20 comprises an input node 24, having input voltage RFS received thereon. Circuit 20 comprises an output node 26, having an output voltage S' received thereon. The output voltage S' is then provided to a circuit not represented, in order to be processed and in order to generate the signal S of FIG. 1. For example, the signal not represented carries out a digital process. Circuit 20 comprises an input node 28, having reference voltage GND received thereon.

Circuit 20 comprises an automatic gain control loop. The loop comprises a variable gain circuit, or gain stage, 30. Circuit 30 is for example a power sensor or a variable-gain amplifier. Circuit 30 is coupled, preferably connected, to node 24, and thus receives input signal RFS. Circuit 30 is further coupled, preferably connected, to the output node 26 delivering signal S'. Circuit 30 further comprises a control input 32, on which circuit 30 receives information representing the gain variation. In other words, the gain of circuit 30 varies according to the voltage supplied on the control input.

The control loop comprises a circuit 34 configured to generate the signal for controlling circuit 30. Control input 32 is coupled, preferably connected, to an output of circuit 34. Circuit 34 is coupled, preferably connected, by an input, to output node 26. Circuit 34 is coupled, preferably connected, by another input, to a node 36 having a set point voltage applied thereto. The gain of circuit 30 is thus modified according to the difference between the voltage on node 26 and the set point voltage on node 36.

Circuit 20 comprises a resistor 38 coupled between node 22 and node 26. In other words, a terminal of resistor 38 is coupled, preferably connected, to node 22 and the other one is coupled, preferably connected, to node 26, and thus to the output node of circuit 30.

Circuit 20 comprises two voltage sources 40 and 42. Voltage source 42 is coupled between node 28 and a node 44. In other words, a terminal, preferably the positive terminal (+), of source 42 is coupled, preferably connected, to node 36 and another terminal, preferably the negative terminal (−), of source 42 is coupled, preferably connected, to node 28. Source 42 delivers, between nodes 44 and 28, a preferably substantially constant voltage V42, for example in the range from 0 V to 1.5 V, for example, substantially equal to 0.2 V. Voltage source 40 is coupled between node 22 and a node 46. In other words, a terminal, preferably the positive terminal (+), of source 40 is coupled, preferably connected, to node 22 and another terminal, preferably the negative terminal (−), of source 40 is coupled, preferably connected, to node 46. Source 40 delivers, between nodes 44 and 28, a preferably substantially constant voltage V40, for example, in the range from 0 V to VDD2, for example, substantially equal to 1.2 V.

Thus, the voltage on node 44 is equal to V42, that is, for example, substantially equal to 0.2 V, and the voltage on node 46 is substantially equal to VDD2–V40, that is, for example, substantially equal to VDD2–1.2 V.

Circuit 20 comprises a selection circuit, or element, 48. On one side of circuit 48, a terminal of circuit 48 is coupled, preferably connected, to node 46 and another terminal of circuit 48 is coupled, preferably connected, to node 44.

In a first operating mode, called high-linearity operating mode, node 36 is connected to node 44 by selection circuit 48. The voltage on node 36 is thus substantially equal to the voltage on node 44. The value of the set point voltage is then substantially constant. The value of the set point voltage is independent from the power supply voltage VDD2 of circuit 20.

In a second operating mode, called low-power operating mode, node 36 is connected to node 46 by selection circuit 48. The voltage on node 36 is thus substantially equal to the voltage on node 46. The value of the set point voltage is then dependent on power supply voltage VDD2. The higher the power supply voltage, the higher the set point voltage.

The switching from one operating mode to the other corresponds to the switching between states of selection circuit 48. In other words, the control of the switching from one operating mode to the other is performed by controlling selection circuit 48. The switching from one operating mode to the other may for example be performed manually by a user or automatically by software.

Figure 3:
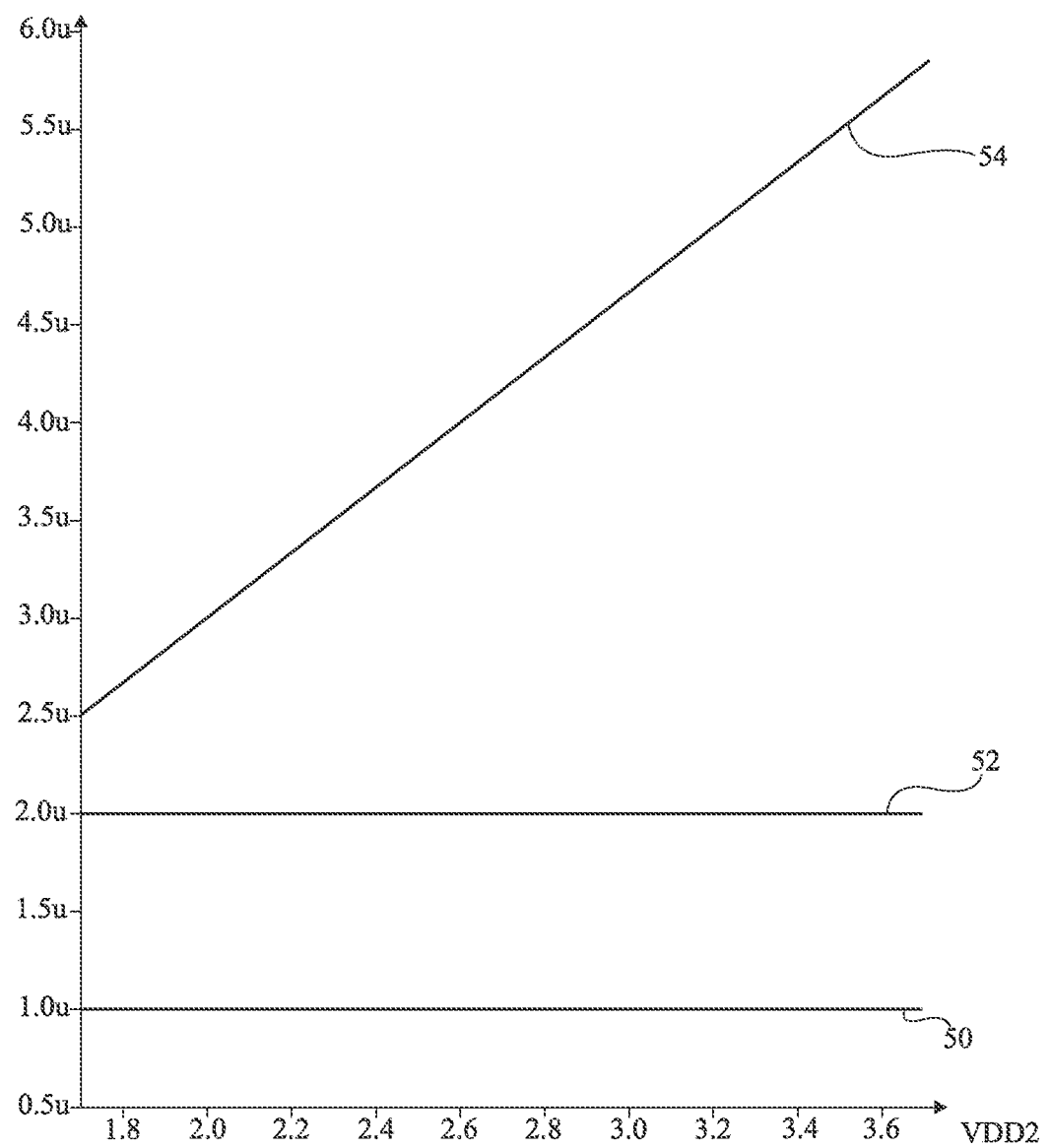
FIG. 3 illustrates the operation of the circuit of FIG. 2.

FIG. 3 illustrates the operation of the embodiment of FIG. 2. More precisely, FIG. 3 shows, in Amperes, the current consumed by circuit 20 according to the value of power supply voltage VDD2, in Volts.

FIG. 3 shows a curve 50 illustrating the power consumption of circuit 20 during operating periods during which no radio frequency signal is received by circuit 20. FIG. 3 shows a curve 52 illustrating the power consumption of circuit 20 during periods B of the first operating mode, that is, the low-power operating mode. FIG. 3 shows a curve 54 illustrating the maximal power consumption circuit 20 during the high-linearity operating mode.

As illustrated by the curve 50, the power consumption is substantially constant and is, in this example, substantially equal to 1 µA, when the antenna does not receive radio frequency signals.

The maximal power consumption, that can be reached in the presence of a radio frequency signal and/or an interfering channel, in the low-power operating mode, represented by curve 52, is substantially constant, and is, in this example, substantially equal to 2 µA. The maximal power consumption represented by curve 52 is greater than the power consumption represented by curve 50. In the absence of signal, the consumption in low power mode is substantially equal to 1 µA and corresponds to curve 50.

The power consumption in the high-linearity operating mode is dependent on power supply voltage VDD2. The power consumption is increasing according to the power supply voltage. In the absence of signal, the consumption in high linearity mode is substantially equal to 1 µA and corresponds to curve 50.

Figure 4:
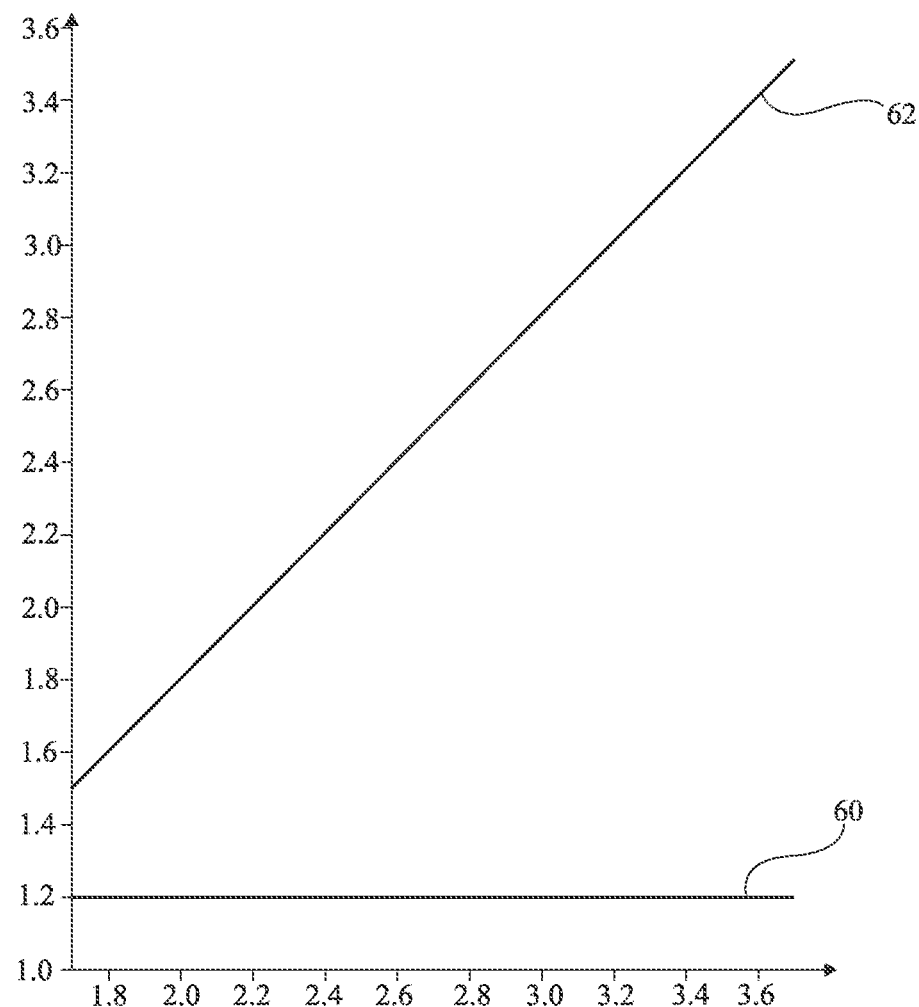
FIG. 4 illustrates the operation of the embodiment of FIG. 2.

Thus, in the example of FIG. 4, the power consumption in the low-power mode is smaller than the power consumption in the high-linearity mode. Further, the higher power supply voltage VDD2, the higher the power consumption in high linearity mode.

FIG. 4 illustrates the operation of the embodiment of FIG. 2. More precisely, FIG. 4 shows the amplitude of the range of possible values for the input signals, that is the radio frequency signals or the signals of interfering channels, according to the value of power supply voltage VDD2, in volts.

FIG. 4 shows a curve 60 illustrating the difference during the second operating mode, that is, the low-power operating mode. FIG. 4 represents a curve 62 illustrating the difference during the first operating mode, that is the high linearity operating mode.

The amplitude of the range of possible values for the input signals is independent from the value of power supply voltage VDD2 in the low power operating mode, illustrated by curve 60. Thus, the amplitude is substantially constant, whatever the value of power supply voltage VDD2.

In the high-linearity operating mode, the amplitude of the range of possible values for the input signals depends on the value of power supply voltage VDD2. The higher the power supply voltage, the greater the amplitude of the range of possible values for the input signals, in other words, the greater the accuracy of a radio frequency signal.

The low-power operating mode has a low power consumption as compared with the high-linearity operating mode, but a lower voltage dynamic. It is thus possible to select, according to the application of the device, which operation mode is the most adapted. It is also possible, for a same application, to select one or the other of the operating modes, for certain periods. For example, certain operating periods may have been determined as requiring a greater dynamic than other periods.

An advantage of the described embodiments is that it is possible to choose, for the wake-up circuit of the radio frequency receiver circuit, between a power intensive, but possessing a great voltage dynamic, operating mode and a low power, but possessing a limited voltage dynamic, operating mode.

Another advantage of the described embodiments is that the wake-up circuit can use a power supply voltage used in another portion of the device, for example, the same power supply as the main circuit of the receiver. A linear voltage regulator is thus not necessary to generate a power supply voltage having a value specific to the radio frequency wave receiver circuit.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:
1. A radio frequency signal receiver circuit comprising:
   a main circuit configured to process radio frequency signals; and
   a wake-up circuit configured to detect a reception of the radio frequency signals, the wake-up circuit comprising an automatic gain control loop, the wake-up circuit being configured to have a first operating mode where a set point voltage of the loop has a first substantially constant value, and a second operating mode where the set point voltage of the loop has a second value dependent on a power supply voltage of the wake-up circuit.

2. The receiver circuit of claim 1, further comprising an antenna terminal configured to deliver a first signal to the wake-up circuit on a first node.

3. The receiver circuit of claim 2, wherein the wake-up circuit is configured to deliver on a second node a second signal commanding the waking up of the main circuit.

4. The receiver circuit of claim 3, wherein the wake-up circuit comprises a resistor coupled between a third node of application of the power supply voltage of the wake-up circuit and the second node.

5. The receiver circuit of claim 4, wherein the loop comprises a variable gain circuit having a first input coupled to the first node and an output coupled to the second node.

6. The receiver circuit of claim 5, wherein the loop comprises a control circuit configured to control a gain of the variable gain circuit, the control circuit having a first input coupled to the second node, and a second input coupled to a set point voltage node configured to receive a set point voltage.

7. The receiver circuit of claim 6, wherein the second input of the control circuit is coupled, via a selection circuit, to fourth and fifth nodes of application of voltages having respectively the first and second values.

8. The receiver circuit of claim 7, wherein the fourth node is coupled to a sixth node of application of a reference voltage by a first voltage source configured to deliver on the fourth node a voltage having the first value.

9. The receiver circuit of claim 7, wherein the fifth node is coupled to the third node by a second voltage source, in such a way that the voltage on the fifth node is dependent on the power supply voltage.

10. The receiver circuit of claim 2, further comprising an antenna coupled to the antenna terminal and configured to deliver via the antenna terminal the first signal to the wake-up circuit on the first node.

11. The receiver circuit of claim 1, wherein the power supply voltage is in a range from 0.1 V to 5V.

12. The receiver circuit of claim 1, wherein a power supply voltage of the main circuit is substantially equal to the power supply voltage of the wake-up circuit.

13. The receiver circuit of claim 1, wherein the receiver circuit is configured to operate in on-off keying or in Manchester type on-off keying.

14. An automatic gain control circuit comprising:
a first output configured to deliver an output signal; and
a control input configured to receive a gain control signal, wherein a gain of the automatic gain control circuit is based on a voltage different between the output signal and the gain control signal, wherein, in a first operating mode, a set point voltage of the automatic gain control circuit has a first value substantially constant, and, in a second operating mode, the set point voltage has a second value depending on a supply voltage of the automatic gain control circuit.

15. The automatic gain control circuit of claim 14, wherein the automatic gain control circuit is configured to receive the supply voltage at the first output via a resistor.

16. A method comprising:
receiving a first supply voltage at a first supply node;
delivering an output signal at a first output of an automatic gain control circuit;
receiving a gain control signal at a control input of the automatic gain control circuit, wherein a gain of the automatic gain control circuit is based on a voltage difference between the first output and the control input;
in a first operating mode, setting a set point voltage at the first output to a first value that is substantially constant; and
in a second operating mode, setting the set point voltage at the first output to a second value depending on the first supply voltage.

17. The method of claim 16, further comprising:
receiving an input signal;
powering a main circuit with the first supply voltage;
processing the input signal with the main circuit; and
waking up the main circuit using the output signal.

18. The method of claim 17, receiving the input signal with an antenna that is coupled to the automatic gain control circuit and to the main circuit.

19. The method of claim 16, wherein, during the first operating mode, providing the gain control signal using a first voltage source coupled to a reference node, and, during the second operating mode, providing the gain control signal with a second voltage source coupled to the first supply node.

20. The method of claim 16, further comprising powering the automatic gain control circuit using the first supply voltage, wherein the first supply voltage varies within a first voltage range, and wherein, during the first operating mode, the automatic gain control circuit consumes a substantially constant current when the first supply voltage varies within the voltage range.

21. The method of claim 20, wherein the first voltage range comprises a voltage range between 1.8 V and 3.6 V.

* * * * *